United States Patent
Pietraski

(10) Patent No.: US 7,715,498 B2
(45) Date of Patent: *May 11, 2010

(54) WIRELESS COMMUNICATION METHOD AND APPARATUS FOR PERFORMING POST-DETECTION CONSTELLATION CORRECTION

(75) Inventor: Phillip J. Pietraski, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/274,806

(22) Filed: Nov. 20, 2008

(65) Prior Publication Data

US 2009/0074111 A1 Mar. 19, 2009

Related U.S. Application Data

(63) Continuation of application No. 11/506,221, filed on Aug. 18, 2006, now Pat. No. 7,460,617, which is a continuation of application No. 10/980,692, filed on Nov. 3, 2004, now Pat. No. 7,106,811.

(60) Provisional application No. 60/519,102, filed on Nov. 12, 2003.

(51) Int. Cl.
*H04L 27/00* (2006.01)

(52) U.S. Cl. .................................................. 375/324

(58) Field of Classification Search ................ 375/264, 375/261, 269, 259, 316, 268, 320, 324, 327, 375/340, 345, 354, 371, 377; 714/46, 699; 370/207, 206, 203, 430; 329/304; 342/194; 455/127.2

See application file for complete search history.

(56) References Cited

U.S. PATENT DOCUMENTS

| 4,866,395 | A | 9/1989 | Hostetter |
|---|---|---|---|
| 5,040,181 | A | 8/1991 | Roux |
| 5,311,545 | A | 5/1994 | Critchlow |
| 5,506,865 | A | 4/1996 | Weaver, Jr. |
| 2001/0026596 | A1 | 10/2001 | Orihashi et al. |
| 2005/0147190 | A1 | 7/2005 | Nishikawa |
| 2006/0039506 | A1 | 2/2006 | D'Alessandro |

OTHER PUBLICATIONS

IEEE-SA Standards Board, "Part 11: Wireless LAN Medium Access Control (MAC) and Physical Layer (PHY) Specifications; High Speed Physical Layer in the 5 GHz Band", Supplement to IEEE Standard for Information Technology—Telecommunications and Information Exchange Between Systems—Local and Metropolitan Area Networks—Specific Requirements; IEEE Std 802.11a-1999(R203), pp. 1-83.

*Primary Examiner*—David C Payne
*Assistant Examiner*—Vineeta S Panwalkar
(74) *Attorney, Agent, or Firm*—Volpe and Koenig, P.C.

(57) ABSTRACT

A method and apparatus for correcting the phase and gain of data associated with a constellation pattern of a plurality of received individual symbols. Each symbol is divided into real and imaginary symbol components. The signs of the real and imaginary symbol components of each symbol are determined and used as a basis for determining whether the symbol is associated with a first or third quadrant of the constellation pattern or a second or fourth quadrant of the constellation pattern. The absolute values of the real and imaginary symbol components are determined and used to create a first sum and a second sum. A phase adjustment value θ and a gain adjustment value G are derived from the first and second sums, and are used to create a complex number. Each of the received individual symbols is multiplied by the created complex number to provide corrected constellation pattern data.

14 Claims, 5 Drawing Sheets

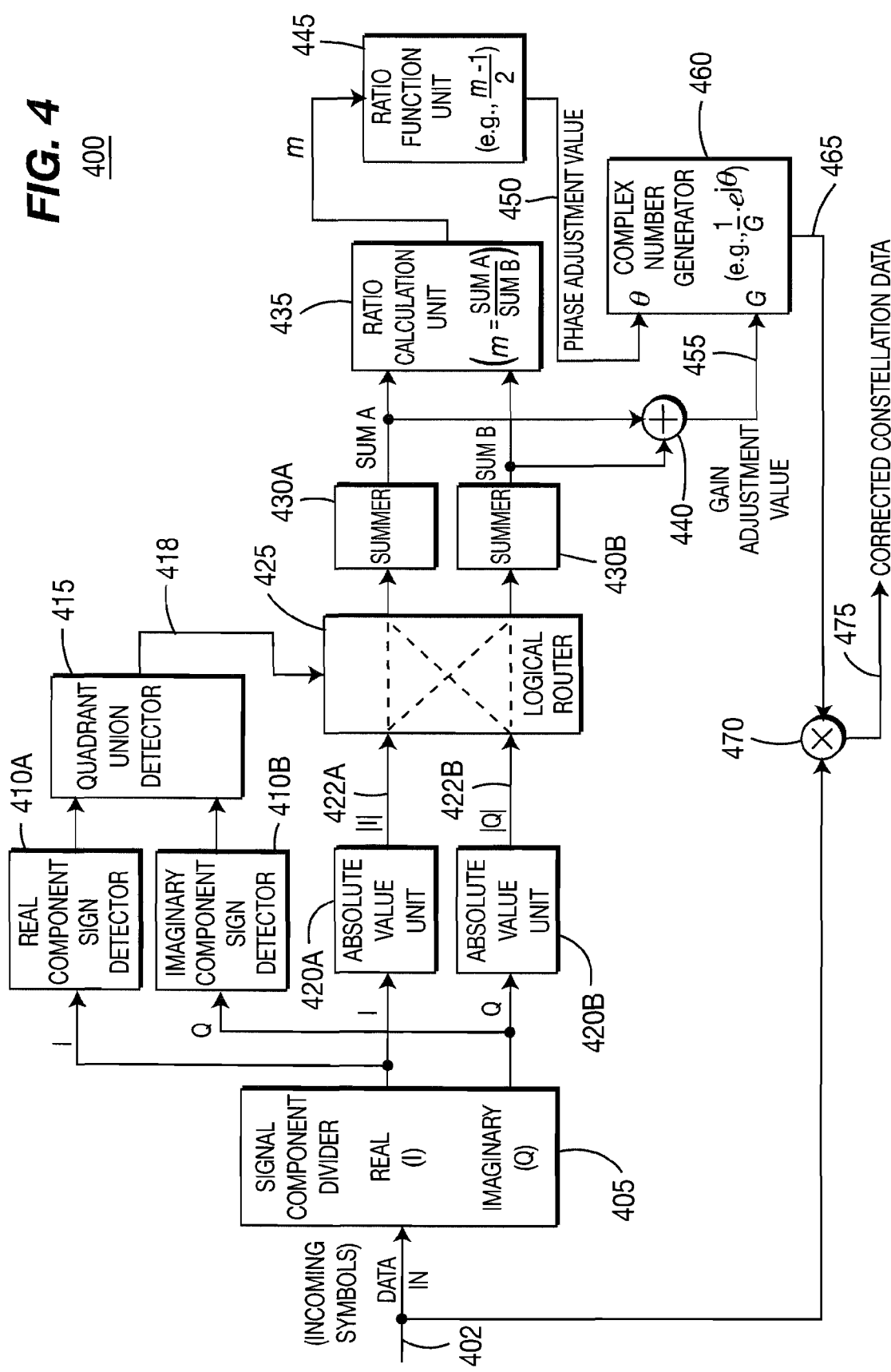

1

WIRELESS COMMUNICATION METHOD AND APPARATUS FOR PERFORMING POST-DETECTION CONSTELLATION CORRECTION

CROSS REFERENCE TO RELATED APPLICATION

This application is a continuation of U.S. patent application Ser. No. 11/506,221 filed Aug. 18, 2006, which is a continuation of U.S. patent application Ser. No. 10/980,692 filed Nov. 3, 2004, which issued as U.S. Pat. No. 7,106,811 on Sep. 12, 2006, which claims the benefit of U.S. Provisional Patent Application Ser. No. 60/519,102, filed Nov. 12, 2003, which are incorporated by reference as if fully set forth herein.

FIELD OF INVENTION

The invention relates to a wireless communication receiver. More particularly, the present invention relates to the reception of wireless signals in the presence of imperfect channel estimation.

BACKGROUND

When a transmission is made in a multipath environment, the propagating channel introduces distortions in the transmitted signal which degrade the signal quality at the receiver. In many wireless communications systems, knowledge of the channel state is required to properly demodulate the transmission. Thus, a channel estimate is performed at the receiver and is subsequently used to demodulate data.

Quadrature amplitude modulation (QAM) is a method of combining two amplitude-modulated (AM) signals into a single channel, thereby doubling the effective bandwidth. QAM is used with pulse amplitude modulation (PAM) in digital systems, especially in wireless applications. In a QAM signal, there are two carriers, each having the same frequency but differing in phase by ninety degrees, (i.e., one quarter of a cycle, from which the term quadrature arises). One signal is called the real or in-phase (I) signal and the other is called the imaginary or quadrature (Q) signal. Mathematically, one of the signals can be represented by a sine wave, and the other by a cosine wave. The two modulated carriers are combined at the source for transmission. At the destination, the carriers are separated, the data is extracted from each, and then the data is combined into the original modulating information.

In digital applications, the modulating signal is generally quantized in both its in-phase and ninety degree components. The set of possible combinations of amplitudes, as shown on an x-y plot, is a pattern of dots known as a QAM constellation. This constellation, and therefore the number of bits which can be transmitted at once, can be increased for higher bit rates and faster throughput, or decreased for more reliable transmission with fewer bit errors. The number of "dots" in the constellation is given as a number before the QAM, and is often an integer power of two, i.e., from $2^1$ (2QAM) to $2^{12}$ (4096QAM).

In many wireless systems, such as frequency division duplex (FDD), time division duplex (TDD), and IEEE 802.11 systems, the channel estimate is performed based on a known transmission, i.e., a pilot signal. However, the channel state changes over a period of time and therefore the channel estimate may no longer be an accurate estimate of the channel during much of the transmission. The effect of the channel drift, in part, can be seen in the constellation diagram of a packet of received symbols as distinctly non-Gaussian noise or distortion about the constellation points.

One method to compensate for channel drift is to perform channel estimates at a higher rate. When the pilot signal is time multiplexed with the data, this may be difficult. When the pilot signal is continuously transmitted, channel estimates can be performed at an arbitrary rate, but may pose an unacceptable computational burden or processing delay.

Adaptive receivers, such as normalized least mean squared (NLMS) equalizers, also suffer degradation that can be seen in the constellation diagram even when a continuous pilot signal is present. In this case, it is not the lack of current channel estimation that causes the distortion, but rather it is due to the receiver remaining in a tracking state and thus never converges. The effect is equivalent to the above description of receivers that have channel estimates that become increasingly unreliable after they are created, i.e., the adaptive receiver has an implied channel estimate that is always delayed and therefore is not completely reflective of the current channel conditions.

SUMMARY

The present invention is related to a wireless communication method and apparatus for correcting the phase and gain of data associated with a constellation pattern of a plurality of received individual symbols. The apparatus may be a receiver, a wireless transmit/receive unit (WTRU) and/or an integrated circuit (IC).

In accordance with the present invention, each individual symbol is divided into real and imaginary symbol components. The signs of the real and imaginary symbol components of each symbol are determined and used as a basis for determining whether the symbol is associated with a first or third quadrant, (i.e., a first quadrant union), of the constellation pattern or a second or fourth quadrant, (i.e., a second quadrant union), of the constellation pattern. The first and second quadrant unions partition the constellation space. The absolute values of the real and imaginary symbol components are determined and used to create a first sum and a second sum. A sum ratio m is determined by dividing the first sum by the second sum. A predetermined function is performed on sum ratio m to determine a phase adjustment value θ. A gain adjustment value G is determined by adding the first and second sums together. A complex number is created based on the phase adjustment value θ and the gain adjustment value G. Each of the received individual symbols is multiplied by the created complex number to provide corrected constellation pattern data.

BRIEF DESCRIPTION OF THE DRAWINGS

A more detailed understanding of the invention may be had from the following description, given by way of example and to be understood in conjunction with the accompanying drawings wherein:

FIG. 4 is a block diagram of a receiver for partitioning incoming data, estimating gain and phase corrections, and applying the gain and phase corrections to the symbols in the constellation in accordance with a preferred embodiment of the present invention.

DETAILED DESCRIPTION OF THE PREFERRED EMBODIMENT(S)

Figure 1:
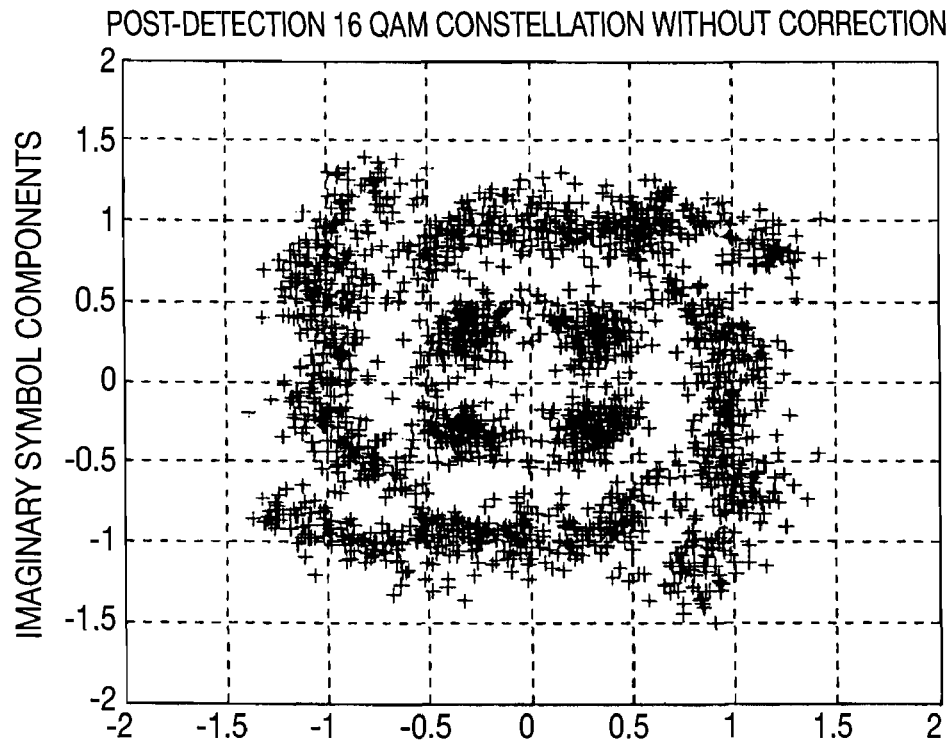
FIG. 1 shows a 16QAM constellation diagram of a received packet of symbols for a conventional post-detection channel without constellation correction.

The preferred embodiments will be described with reference to the drawing figures where like numerals represent like elements throughout.

Hereafter, the terminology "WTRU" includes but is not limited to a user equipment (UE), a mobile station, a fixed or mobile subscriber unit, a pager, or any other type of device capable of operating in a wireless environment.

The present invention is applicable to any type of wireless communication systems such as universal mobile telecommunications system TDD (UMTS-TDD) and FDD, time division synchronous code division multiple access (TD-SCDMA), code division multiple access 2000 (CDMA 2000), and CDMA in general or any other type of wireless communication system. With respect to CDMA 2000, the present invention may be implemented in EV-DO (i.e. data only) and EV-DV (i.e. data and voice).

The features of the present invention may be incorporated into an IC or be configured in a circuit comprising a multitude of interconnecting components.

The present invention is generally applicable to a typical receiver with a channel estimator, but may also be applicable to an adaptive receiver. Once a channel estimate is calculated, that estimate is used for some time period afterwards under the assumption that the estimate remains sufficiently accurate. However, for a third generation partnership project (3GPP) VA120 channel model, (i.e., a channel model corresponding to a mobile station traveling at 120 kph), when the channel varies rapidly compared to the channel estimate update rate due to the rapidly moving mobile station, the assumed channel estimate may become inaccurate because the constellation pattern of the detected receiver symbols may exhibit phase errors, gain errors and non-Gaussian characteristics.

FIG. 1 illustrates a post-detection 16QAM constellation for a VA120 model channel without constellation correction. The constellation shown in FIG. 1 has non-Gaussian distortion and a decreased signal-to-noise ratio (SNR).

Figure 2:
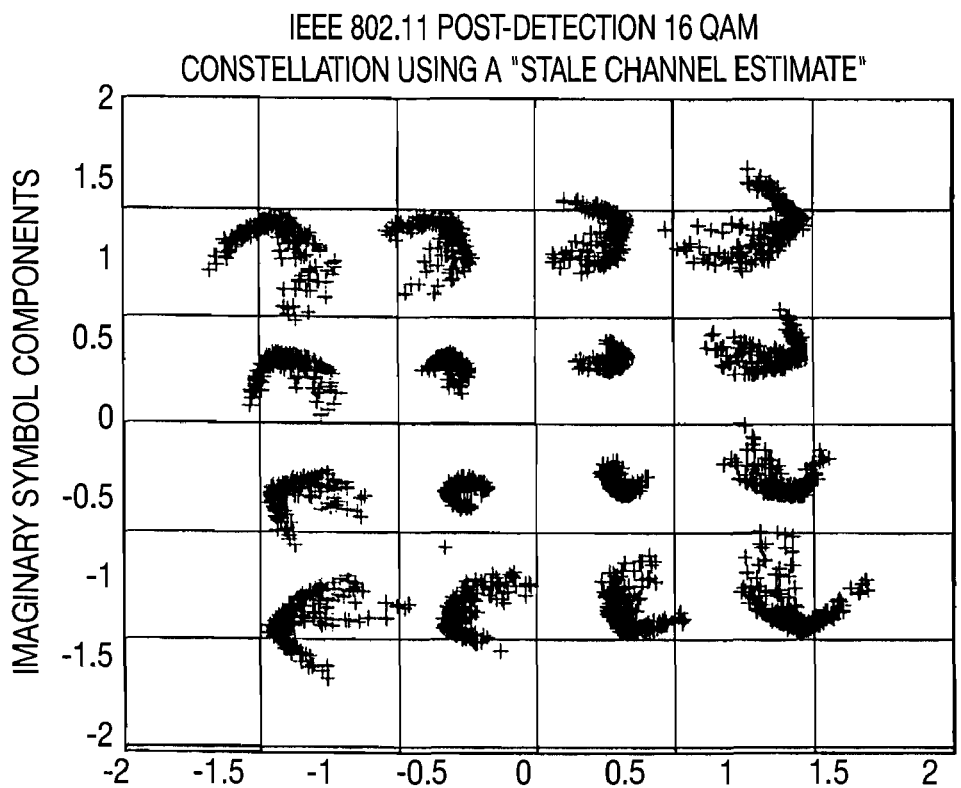
FIG. 2 shows a 16QAM constellation diagram of a received packet of symbols for a conventional IEEE 802.11 post-detection channel using a "stale channel estimate"

FIG. 2 shows the effect of using a "stale channel estimate" in a high velocity mobile IEEE 802.11(a) system, which is also clearly visible as a non-Gaussian noise distribution upon the 16QAM. A "stale channel estimate" refers to the situation when the channel varies rapidly compared to the channel estimate update rate. In other words, a channel that has changed substantially since the last time it was estimated is a "stale channel estimate."

The noise distributions tend to have ridges in the complex plane that can be well described by a simple function of time, t, with t=0 at the time the channel estimate was made in accordance with the present invention. For example, the ridge locations in polar coordinates for the post multi-user detector (MUD) symbols in a 3GPP VA120 channel model are well described by the parametric Equations (1) and (2) as follows:

$$r(t) = r_0 + r_1 t \quad \text{Equation (1)}$$

$$\theta(t) = \theta_0 + \theta_1 t \quad \text{Equation (2)}$$

where t is the time since the channel estimate, r(t), is the radial distance from the origin, and θ(t) is the angle distance. The parameters $r_0$ and $\theta_0$ correspond to an amplitude and phase, and the parameters $r_1$ and $\theta_1$ correspond to an amplitude drift and phase drift. In general, additional terms corresponding to greater powers of t may be included.

Figure 3:
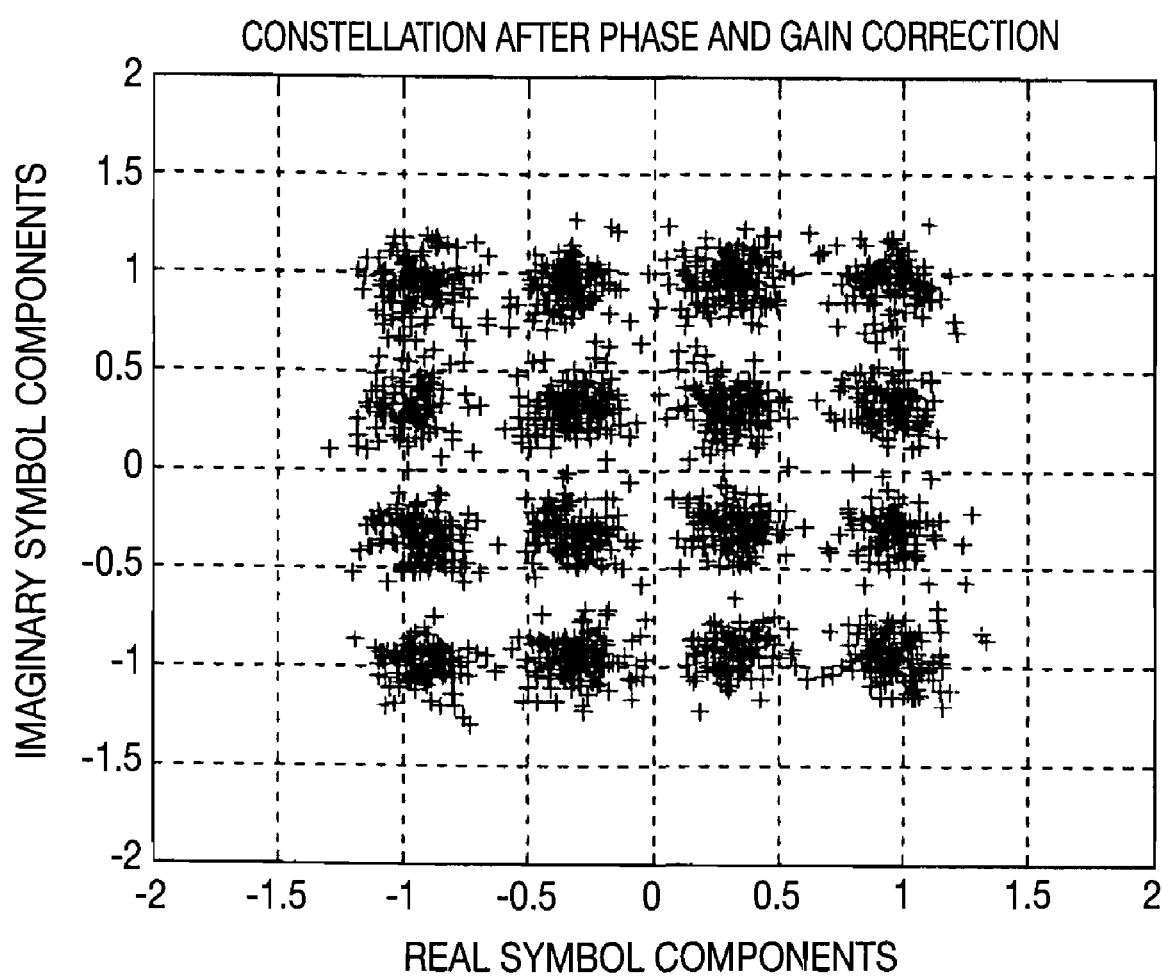
FIG. 3 shows a 16QAM constellation representation of a post-detection channel after constellation correction has been applied in accordance with the present invention.

FIG. 3 shows the resulting constellation after application of a process implemented in accordance with the present invention after the application of the constellation correction process reflected in Equations (1) and (2). The characteristics of the constellation illustrated in FIG. 3 are superior to those in FIGS. 1 and 2 because the constellation points are closer to their reference constellation points and become more Gaussian in their distribution. Thus, the probability of bit error is reduced and the SNR is significantly increased.

Upon making a hard decision for each symbol, a gain and phase error associated with each symbol is formed. The present invention estimates the parameters $r_0, r_1, \ldots, r_n$ and $\theta_0, \theta_1, \ldots, \theta_n$, based on the estimated errors for each symbol, (e.g., by variations of linear regression or other methods used for curve fitting) and the correction is applied to the entire constellation based on the estimates.

The above-mentioned process can be iterated to increase the effectiveness if desired because as the constellation becomes more corrected, fewer symbols may cause hard decision errors.

It is not necessary to use all of the detected symbols, or to give them equal weight, when estimating the parameters $r_0$, $r_1, \ldots, r_n$ and $\theta_0, \theta_1, \ldots, \theta_n$. Since the estimated symbols nearest the time of the channel estimate are better, these symbols may be considered with higher weight as they are most likely to result in correct hard decisions. A subset of the symbols that correspond to a 'fresh' channel estimate may be used while ignoring the other symbols.

The same idea is easily extended to cases where frequency division multiplexing (FDM) is employed, (e.g., OFDM, DMT, COFDM, MC-CDMA, or the like). In such cases, the channel estimates may not only be restricted to certain time intervals but also to certain frequency intervals. For example, in an IEEE 802.11(a) system, pilot signals are provided at selected times and frequencies.

The method of constellation correction according to Equations (1) and (2) is applicable to the type of noise distribution associated with FDM systems. A more general form of Equations (1) and (2) that incorporate higher orders terms in both time (t) and frequency (f) may be written as:

$$r(t, f) = r_{0,0} + r_{1,0}t + r_{0,1}f + r_{1,1}tf + r_{2,0}t^2 + \ldots = \sum_{i,j} r_{i,j} t^i f^j \quad \text{Equation (3)}$$

$$\theta(t, f) = \theta_{0,0} + \theta_{1,0}t + \theta_{0,1}f + \theta_{1,1}tf + \theta_{2,0}t^2 + \ldots = \sum_{i,j} \theta_{i,j} t^i f^j \quad \text{Equation (4)}$$

In a special case where only the $0^{th}$ order corrections are required, (i.e., the bulk phase/gain terms that don't depend on t), simplifications may be made to reduce complexity of the present invention. The present invention is particularly useful in adaptive receivers and applies to a large class of constellations without requiring hard decisions to be made. The correction of gain requires only averaging the magnitude of the real and imaginary components of the constellation points to find and correct the gain error. To find and correct the phase, additional categorization of real and imaginary components, (based on their signs, i.e., the quadrant of the symbol), is required, but adds negligibly to the complexity. The bulk phase error of the constellation can be computed from a ratio of a partition into two such categories. The phase error is well approximated by a simple function of the ratio.

FIG. 4 is a block diagram of a receiver 400 for partitioning incoming data, estimating gain and phase corrections, and applying the gain and phase corrections to the symbols in the constellation in accordance with a preferred embodiment of the present invention.

The receiver 400 includes a symbol component divider 405, a real component sign detector 410A, an imaginary component sign detector 410B, a quadrant union detector 415, absolute value units 420A, 420B, logical router 425, summers 430A and 430B, ratio calculation unit 435, adder 440, ratio function unit 445, complex number generator 460, and multiplier 470.

Figure 5A:
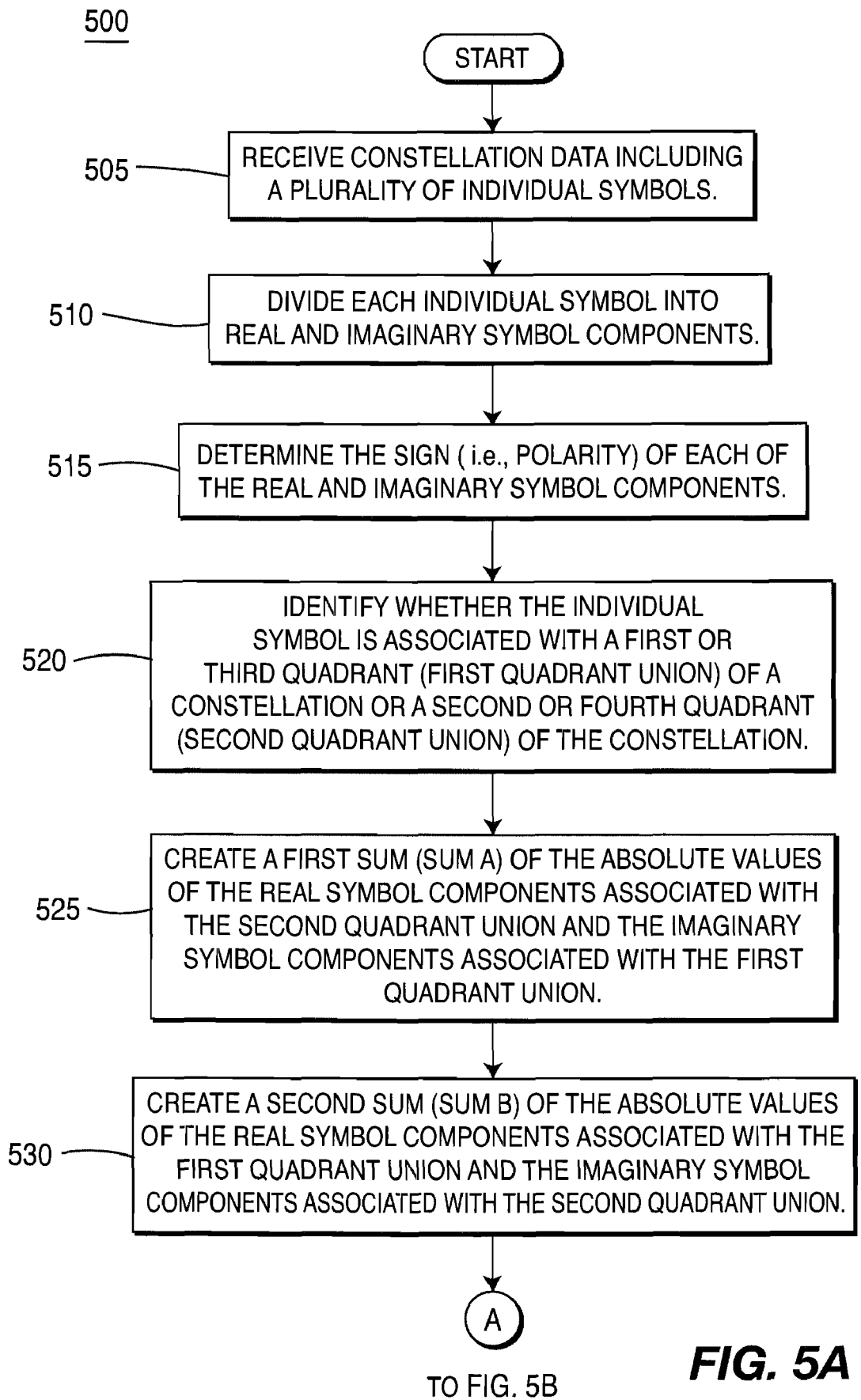
FIGS. 5A and 5B, taken together, are a flow chart of a process including method steps implemented by the receiver of FIG. 4.
Figure 5B:
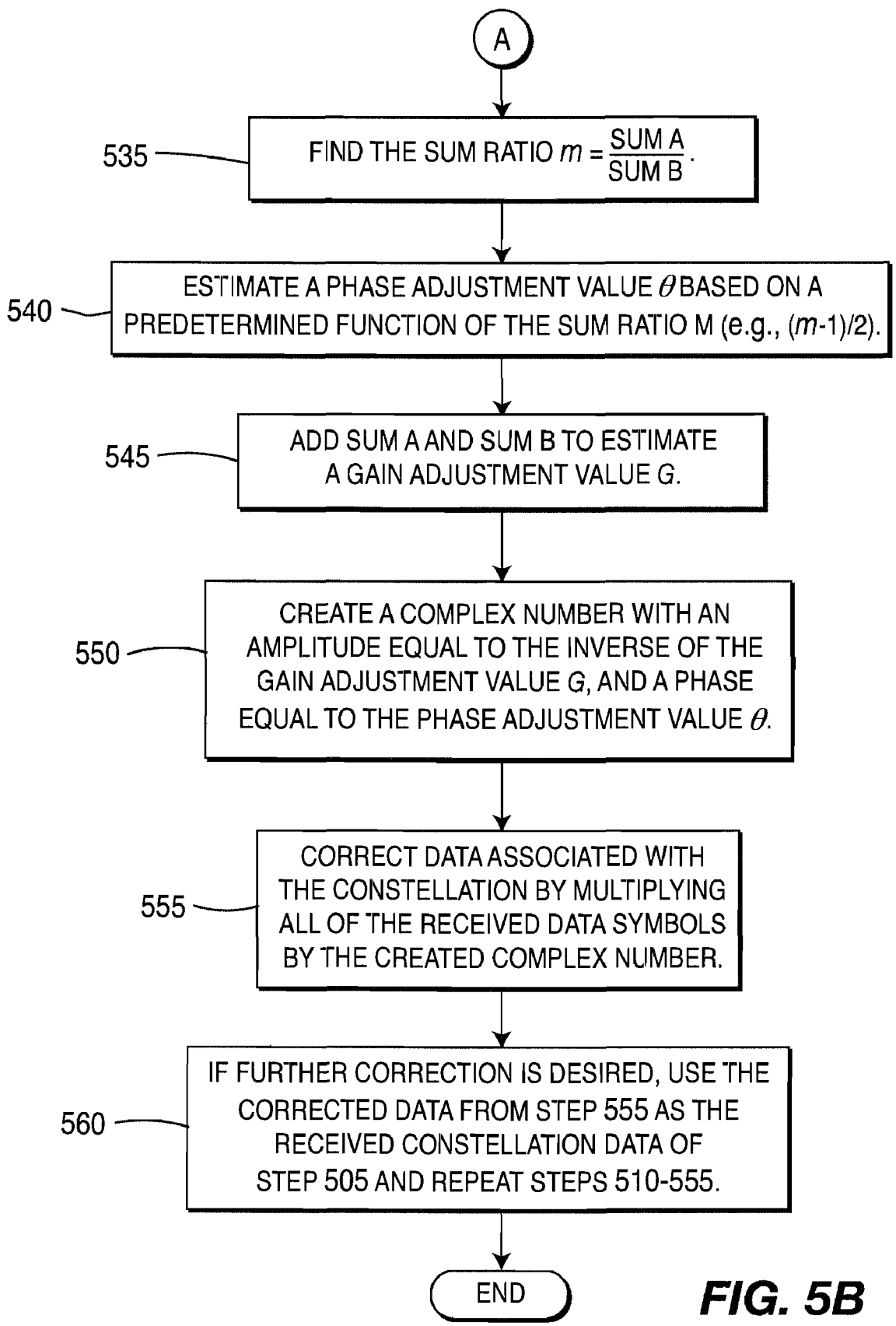

FIGS. 5A and 5B, taken together, are a flow chart of a process 500 including method steps, implemented by the receiver 400 of FIG. 4, for correcting a post-detection constellation.

Referring to FIGS. 4 and 5A, the receiver 400 receives constellation data including a plurality of individual symbols at input 402 (step 505). Each symbol is a complex number having a real and imaginary symbol component. In step 510, each individual symbol is divided, (i.e., split), by the symbol component divider 405 into real and imaginary symbol components. In step 515, the real component sign detector 410A and the imaginary component sign detector 410B determine the sign, (i.e., polarity), of each of the real and imaginary symbol components, respectfully, outputted by the symbol component divider 405. In step 520, the quadrant union detector 415 determines, based on the outputs of the real component sign detector 410A and the imaginary component sign detector 410B, whether the individual symbol is associated with a first or third quadrant, (i.e., a first quadrant union), of a constellation, or a second or fourth quadrant, (i.e., a second quadrant union), of the constellation.

Referring to FIG. 4, the real and imaginary symbol components outputted by the symbol component divider 405 are also respectively fed to the absolute value units 420A, 420B, which output the absolute values, 422A and 422B, of the real and imaginary symbol components, respectively. The absolute values, 422A and 422B are fed to respective inputs of the logical router 425. Based on output 418 of the quadrant union detector 415, which indicates which quadrant union each individual symbol component is associated with, each of the absolute values 422A and 422B are fed to one of the summers 430A and 430B.

Referring to FIGS. 4 and 5A, in step 525, one of the summers, 430A, creates a first sum, sum A, of the absolute values of the real symbol components associated with the second quadrant union and the imaginary symbol components associated with the first quadrant union.

In step 530, the other one of the summers, 430B, creates a second sum, sum B, of the absolute values of the real symbol components associated with the first quadrant union and the imaginary symbol components associated with the second quadrant union.

A description of how the summers 430A and 430B create sum A and sum B will now be described. As previously mentioned, data received at the input 402 of the receiver 400 includes a group of symbols, (i.e., complex numbers). The symbols are "split" into real and imaginary symbol components by the symbol component detector 405 and the absolute values are taken by the absolute value units 420A and 420B, resulting in two groups of numbers: 1) group A—an imaginary symbol component group of numbers; and 2) group B—a real symbol component group of numbers. On a per symbol basis, the logical router 425 swaps some of the numbers in the "real symbol component" group with the corresponding numbers in the "imaginary symbol component" group. Swapping occurs if the corresponding symbol is in the first or third quadrant, as determined by the quadrant union detector 415, whereby its output 418 controls the logical router 425.

For example, if the first symbol received by the receiver 400 via the input 402 is in the first or third quadrant, the first number in the real symbol component group A is swapped with the first number in the imaginary symbol component group B. If the second symbol received by the receiver 400 via the input 402 is in the second or fourth quadrant, a number exchange between the second numbers in groups A and B does not occur, and so on. This process is applied to each received symbol.

All of the numbers in group A are summed up in the summer 430A and all the numbers in group B are summed up in the summer 430B. The input provided by the logical router 425 into each of the summers 430A and 430B is a group of numbers, whereas the output of each of the summers 430A and 430B is a single number.

Referring now to FIGS. 4 and 5B, in step 535, the ratio calculation unit 435 receives sum A and sum B from the outputs of the summers 430A and 430B, and divides sum A by sum B to obtain a resulting sum ratio m which the ratio calculation unit 435 outputs to the ratio function unit 445. In step 540, the ratio function unit 445 performs a simple predetermined function on m, (e.g., (m−1)/2), to estimate a phase adjustment value θ 450, which is the phase of the constellation in radians. In step 545, the adder 440 adds together the outputs of the summers 430A and 430 B to estimate a gain adjustment value G 455, which is the estimated gain of the constellation.

In step 550, the phase adjustment value θ 450 and the gain adjustment value G 455 are input to the complex number generator 460 which performs a complex number function, to create, for example, a complex number 465 with an amplitude equal to the inverse of the gain adjustment value G 455, and a phase equal to the phase adjustment value θ 450, (i.e., $1/G \times e^{j\theta}$). In step 555, data associated with the constellation is corrected by the multiplier 470 multiplying the data symbols received at input 402 by the created complex number 465 to output the resulting corrected data 475. Finally, in step 560, if further correction is desired, the corrected data 475 is used as the received constellation of step 505 which is fed to the input 402, and steps 510-555 are repeated.

While the present invention has been described in terms of the preferred embodiment, other variations which are within the scope of the invention as outlined in the claims below will be apparent to those skilled in the art.

What is claimed is:

1. A method of correcting the phase and gain of data associated with a constellation pattern of a plurality of received individual symbols, the method comprising:
    dividing each individual symbol into real and imaginary symbol components;
    determining whether the individual symbol is associated with a first quadrant union including a first quadrant and a third quadrant of the constellation pattern, or a second quadrant union including a second quadrant and a fourth quadrant of the constellation pattern;
    arranging the real and imaginary symbol components into a plurality of categories based on the association of the individual symbol to the first or second quadrant union;
    estimating a phase adjustment value based on a ratio of the categories; and estimating a gain adjustment value by summing the absolute values of the real and imaginary symbol components.

2. The method of claim 1 wherein a first of the plurality of categories is arranged by creating a first sum of the absolute values of the real symbol components being associated with the second quadrant union and the absolute values of the imaginary symbol components being associated with the first quadrant union.

3. The method of claim 2 wherein a second of the plurality of categories is arranged by creating a second sum of the absolute values of the real symbol components being associated with the first quadrant union and the absolute values of the imaginary symbol components being associated with the second quadrant union.

4. The method of claim 3 wherein estimating the phase adjustment value comprises determining a sum ratio by dividing the first sum by the second sum.

5. The method of claim 4 wherein the phase adjustment value is estimated by performing a predetermined function on the sum ratio.

6. The method of claim 1 further comprising:
creating a complex number based on the phase adjustment value and the gain adjustment value.

7. The method of claim 1 further comprising:
multiplying each of the received individual symbols by the created complex number to provide corrected constellation pattern data.

8. A receiver for correcting the phase and gain of data associated with a constellation pattern of a plurality of received individual symbols, the receiver being configured to:
divide each individual symbol into real and imaginary symbol components;
determine whether the individual symbol is associated with a first quadrant union including a first quadrant and a third quadrant of the constellation pattern, or a second quadrant union including a second quadrant and a fourth quadrant of the constellation pattern;
arrange the real and imaginary symbol components into a plurality of categories based on the association of the individual symbol to the first or second quadrant union;
estimate a phase adjustment value based on a ratio of the categories; and
estimate a gain adjustment value by summing the absolute values of the real and imaginary symbol components.

9. The receiver of claim 8 wherein a first of the plurality of categories is arranged by creating a first sum of the absolute values of the real symbol components being associated with the second quadrant union and the absolute values of the imaginary symbol components being associated with the first quadrant union.

10. The receiver of claim 9 wherein a second of the plurality of categories is arranged by creating a second sum of the absolute values of the real symbol components being associated with the first quadrant union and the absolute values of the imaginary symbol components being associated with the second quadrant union.

11. The receiver of claim 10 wherein the receiver estimates the phase adjustment value by determining a sum ratio by dividing the first sum by the second sum.

12. The receiver of claim 11 wherein the phase adjustment value is estimated by performing a predetermined function on the sum ratio.

13. The receiver of claim 8 wherein the receiver is further configured to create a complex number based on the phase adjustment value and the gain adjustment value.

14. The receiver of claim 8 wherein the receiver is further configured to multiply each of the received individual symbols by the created complex number to provide corrected constellation pattern data.

* * * * *

UNITED STATES PATENT AND TRADEMARK OFFICE
CERTIFICATE OF CORRECTION

| | | |
|---|---|---|
| PATENT NO. | : 7,715,498 B2 | Page 1 of 1 |
| APPLICATION NO. | : 12/274806 | |
| DATED | : May 11, 2010 | |
| INVENTOR(S) | : Philip J. Pietraski | |

It is certified that error appears in the above-identified patent and that said Letters Patent is hereby corrected as shown below:

ON THE TITLE PAGE

At Item (75), Inventor, page 1, left column, line 1, after the word "Inventor", delete "Phillip" and insert therefor --Philip--.

Signed and Sealed this
Twenty-fifth Day of January, 2011

David J. Kappos
*Director of the United States Patent and Trademark Office*